(12) United States Patent
Wadhwa et al.

(10) Patent No.: US 11,017,196 B1
(45) Date of Patent: May 25, 2021

(54) LOOK-AHEAD COLUMN SENSING FOR FAST VOLTAGE MODE READ IN ULTRASONIC SENSORS

(71) Applicant: QUALCOMM Incorporated, San Diego, CA (US)

(72) Inventors: Sameer Wadhwa, San Diego, CA (US); Subbarao Surendra Chakkirala, San Jose, CA (US); Mowen Yang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 16/690,285

(22) Filed: Nov. 21, 2019

(51) Int. Cl.
*G06K 9/00* (2006.01)
*G01N 29/22* (2006.01)

(52) U.S. Cl.
CPC ......... *G06K 9/0002* (2013.01); *G06K 9/0008* (2013.01); *G01N 29/22* (2013.01)

(58) Field of Classification Search
None
See application file for complete search history.

(56) References Cited

U.S. PATENT DOCUMENTS

| | | | |
|---|---|---|---|
| 2014/0354596 A1* | 12/2014 | Djordjev | G06F 3/0421 345/175 |
| 2017/0059699 A1* | 3/2017 | Mathe | A61B 5/117 |
| 2017/0079624 A1* | 3/2017 | Wadhwa | G06K 9/0002 |
| 2018/0046836 A1* | 2/2018 | Hinger | G06K 9/0002 |
| 2018/0213333 A1* | 7/2018 | Kitchens, II | G06K 9/0002 |

* cited by examiner

*Primary Examiner* — Nicholas J Lee
(74) *Attorney, Agent, or Firm* — Patterson & Sheridan, LLP

(57) ABSTRACT

Certain aspects of the present disclosure provide techniques for look-ahead column sensing for fast voltage-mode read on ultrasonic sensors. For example, certain aspects are directed to an ultrasonic sensor that generally includes a column line, a pixel having a transistor coupled between a voltage rail and the column line, a receiver circuit, and a first column control circuit coupled between the receiver circuit and the pixel, the first column control circuit being configured to electrically isolate the column line from the receiver circuit during a look-ahead settling phase of the ultrasonic sensor, and electrically couple the column line to the receiver circuit during a sensing phase of the ultrasonic sensor.

20 Claims, 4 Drawing Sheets

LOOK-AHEAD COLUMN SENSING FOR FAST VOLTAGE MODE READ IN ULTRASONIC SENSORS

BACKGROUND

Field of the Disclosure

Aspects of the present disclosure relate to sensors, and more particularly, to ultrasonic sensors and techniques for operating an ultrasonic sensor.

Description of Related Art

In an ultrasonic sensor system, an ultrasonic transmitter may be used to send (e.g., during a transmission phase) an ultrasonic wave through an ultrasonically transmissive medium or media and towards an object to be detected. The transmitter may be operatively coupled with an ultrasonic sensor (e.g., an ultrasonic receiver) configured to detect (e.g., during a reception phase) portions of the ultrasonic wave that are reflected from the object.

In the context of an ultrasonic fingerprint imager, the ultrasonic wave may travel through a platen on which a person's finger may be placed to obtain a fingerprint image. After passing through the platen, some portions of the ultrasonic wave encounter skin that is in contact with the platen, e.g., fingerprint ridges, while other portions of the ultrasonic wave encounter air, e.g., valleys between adjacent ridges of a fingerprint, and may be reflected with different intensities back towards the ultrasonic sensor. The ultrasonic reflected signals associated with the finger may be processed and converted to a digital value representing the signal strength of the reflected signal. For example, a piezoelectric element may be used to convert the ultrasonic reflection to an electric signal to be processed (e.g., amplified) and sensed by a receiver circuit. When multiple such reflected signals are collected over a distributed area, the digital values of such signals may be used to produce a graphical display of the signal strength over the distributed area, for example by converting the digital values to an image, thereby producing an image of the fingerprint. Thus, an ultrasonic sensor system may be used as a fingerprint imager or other type of biometric scanner.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved ultrasonic sensing.

Certain aspects are directed to an ultrasonic sensor. The ultrasonic sensor generally includes a column line, a pixel having a transistor coupled between a voltage rail and the column line, a receiver circuit, and a first column control circuit coupled between the receiver circuit and the pixel. The first column control circuit is configured to electrically isolate the column line from the receiver circuit during a look-ahead settling phase of the ultrasonic sensor and to electrically couple the column line to the receiver circuit during a sensing phase of the ultrasonic sensor.

Certain aspects are directed to a method for ultrasonic sensing. The method generally includes receiving a sensor signal at a gate of a transistor of a pixel of an ultrasonic sensor, the transistor being coupled between a voltage rail and a column line, electrically isolating the column line from a receiver circuit during the look-ahead settling phase of the ultrasonic sensor, and electrically coupling the column line to the receiver circuit during a sensing phase of the ultrasonic sensor, the sensing phase being after the look-ahead settling phase.

Certain aspects are directed to an apparatus for ultrasonic sensing. The apparatus generally includes means for receiving a sensor signal at a gate of a transistor of a pixel of the apparatus, the transistor being coupled between a voltage rail and a column line, means for electrically isolating the column line from a receiver circuit during a look-ahead settling phase of the apparatus, and means for electrically coupling the column line to the receiver circuit during a sensing phase of the apparatus, the sensing phase being after the look-ahead settling phase.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Example Mobile Device with Ultrasonic Sensor

Figure 1:
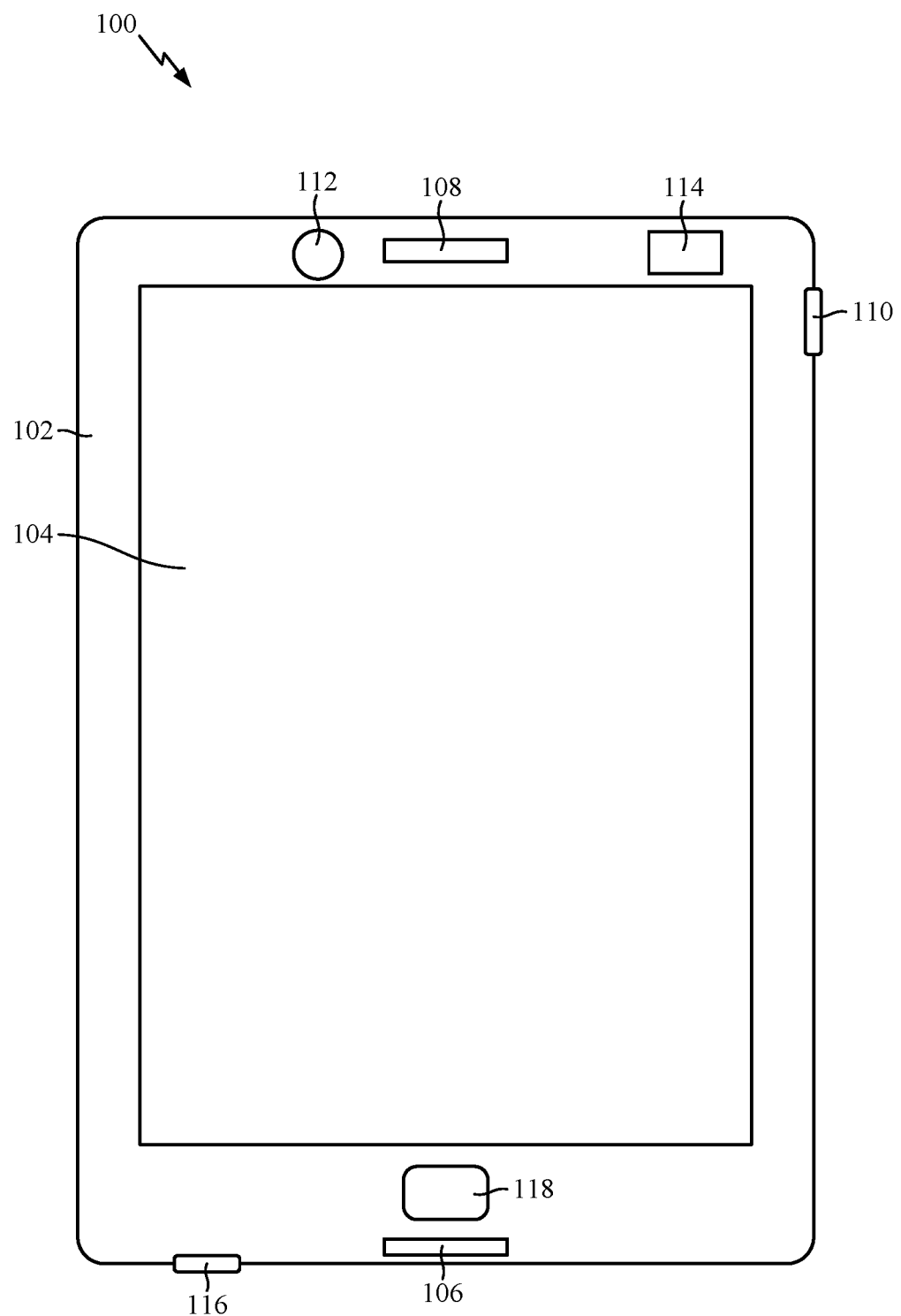
FIG. 1 shows a diagrammatic representation of an example mobile device that includes an ultrasonic sensing system according to some implementations.

FIG. 1 shows a diagrammatic representation of an example mobile device 100 that includes an ultrasonic sensing system according to some implementations. The mobile device 100 may be representative of, for example, various portable computing devices such as cellular phones, smartphones, multimedia devices, personal gaming devices, tablet computers, and laptop computers, among other types of portable computing devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices, and audio systems, among other applications. Additionally, various implementations described herein are not limited in application to devices that include displays.

The mobile device 100 generally includes a housing (or "case") 102 within which various circuits, sensors, and other electrical components reside. In the illustrated example implementation, the mobile device 100 also includes a touchscreen display 104. The mobile device 100 may include various other devices or components for interacting with, or otherwise communicating information to or receiving information from, a user. For example, the mobile device 100 may include one or more microphones 106, one or more speakers 108, and in some cases one or more at least partially mechanical buttons 110. The mobile device 100 may include various other components enabling additional features such as, for example, one or more video or still-image cameras 112, one or more wireless network interfaces 114 (for example, Bluetooth, WiFi or cellular) and one or more non-wireless interfaces 116 (for example, a universal serial bus (USB) interface or a high-definition multimedia interface (HDMI) interface).

The mobile device 100 may include an ultrasonic sensing system 118 capable of scanning and imaging an object signature, such as a fingerprint, palm print, or handprint. In some implementations, the ultrasonic sensing system 118 may function as a touch-sensitive control button. In some implementations, a touch-sensitive control button may be implemented with a mechanical or electrical pressure-sensitive system that is positioned under or otherwise integrated with the ultrasonic sensing system 118. In other words, in some implementations, a region occupied by the ultrasonic sensing system 118 may function both as a user input button to control the mobile device 100 as well as a fingerprint sensor to enable security features such as user authentication features.

Figure 2A:
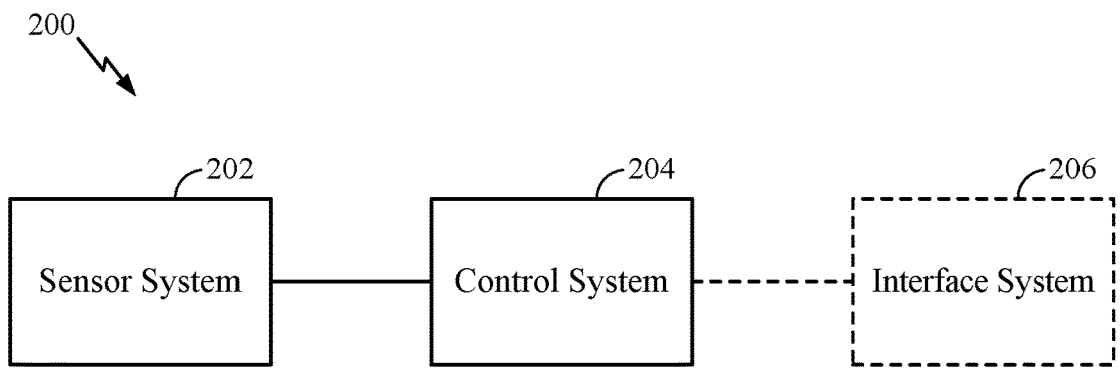
FIG. 2A shows a block diagram representation of components of an example ultrasonic sensing system according to some implementations.

FIG. 2A shows a block diagram representation of components of an example ultrasonic sensing system 200 according to some implementations. As shown, the ultrasonic sensing system 200 may include a sensor system 202 and a control system 204 electrically coupled to the sensor system 202. The sensor system 202 may be capable of scanning an object and providing raw measured image data usable to obtain an object signature, for example, such as a fingerprint of a human finger. The control system 204 may be capable of controlling the sensor system 202 and processing the raw measured image data received from the sensor system. In some implementations, the ultrasonic sensing system 200 may include an interface system 206 capable of transmitting or receiving data, such as raw or processed measured image data, to or from various components within or integrated with the ultrasonic sensing system 200 or, in some implementations, to or from various components, devices, or other systems external to the ultrasonic sensing system.

Figure 2B:
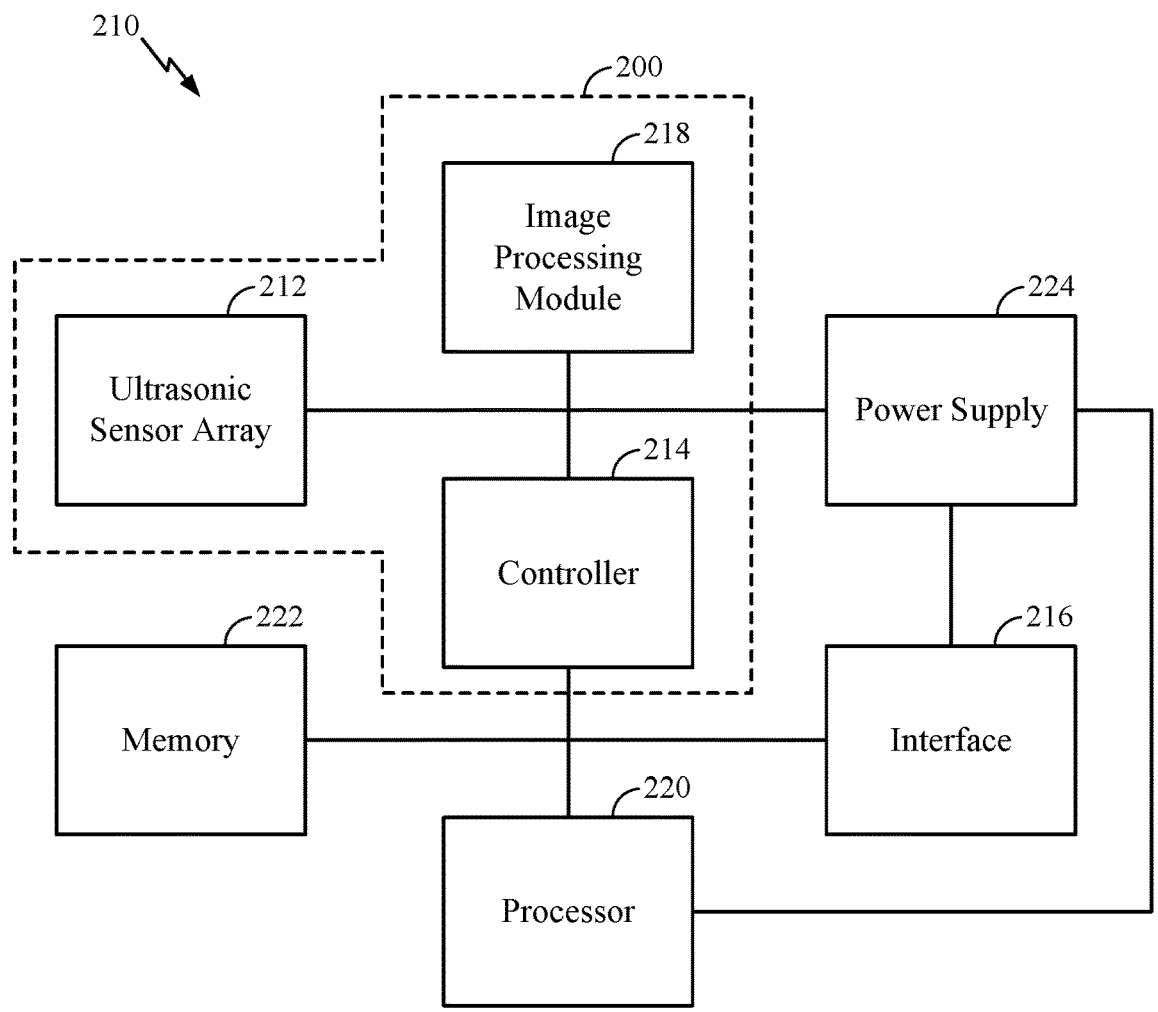
FIG. 2B shows a block diagram representation of components of an example mobile device that includes an ultrasonic sensing system.

FIG. 2B shows a block diagram representation of components of an example mobile device 210 that includes the ultrasonic sensing system 200 of FIG. 2A. For example, the mobile device 210 may be a block diagram representation of the mobile device 100 shown in and described with reference to FIG. 1. The sensor system 202 of the ultrasonic sensing system 200 of the mobile device 210 may be implemented with an ultrasonic sensor array 212. The control system 204 of the ultrasonic sensing system 200 may be implemented with a controller 214 that is electrically coupled to the ultrasonic sensor array 212. While the controller 214 is shown and described as a single component, in some implementations, the controller 214 may collectively refer to two or more distinct control units or processing units in electrical communication with one another.

The ultrasonic sensing system 200 of FIG. 2B may include an image processing module 218. In some implementations, raw measured image data provided by the ultrasonic sensor array 212 may be sent, transmitted, communicated, or otherwise provided to the image processing module 218. The image processing module 218 may include any suitable combination of hardware, firmware, and software configured, adapted, or otherwise operable to process the image data provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), and/or passive or active analog filters, among others.

In some implementations, in addition to the ultrasonic sensing system 200, the mobile device 210 may include a separate processor 220, a memory 222, an interface 216, and a power supply 224. In some implementations, the controller 214 of the ultrasonic sensing system 200 may control the ultrasonic sensor array 212 and the image processing module 218, and the processor 220 of the mobile device 210 may control other components of the mobile device 210. In some implementations, the processor 220 communicates data to the controller 214 including, for example, instructions or commands. In some such implementations, the controller 214 may communicate data to the processor 220 including, for example, raw or processed image data.

Depending on the implementation, one or both of the controller 214 and processor 220 may store data in the memory 222. For example, the data stored in the memory 222 may include raw measured image data, filtered image data, or otherwise processed image data. The memory 222 may store processor-executable code or other executable computer-readable instructions capable of execution by one or both of the controller 214 and the processor 220 to perform various operations (or to cause other components such as the ultrasonic sensor array 212, the image processing module 218, or other modules to perform operations), including any of the operations described herein.

In some implementations, the controller 214 or the processor 220 may communicate data stored in the memory 222 or data received directly from the image processing module 218 through an interface 216 (e.g., corresponding to the interface system 206). For example, such communicated data can include image data or data derived or otherwise determined from image data. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system or server. A power supply 224 may provide power to some or all of the components in the mobile device 210.

Example Techniques for Look-Ahead Column Sensing for Fast Voltage-Mode Read in Ultrasonic Sensors State-of-the-art thin-film-transistor (TFT) sensors may rely on current-mode sensing to speed up ultrasonic sensing in the presence of large parasitics. However, current-mode sensing is more sensitive to system noise, as compared to voltage sensing, because of a long high-impedance sense-node interface between the sensor and receiver circuit (e.g., a receiver application specific integrated-circuit (ASIC)). Voltage-mode sensing provides better noise immunity as compared to current-mode sensing, but suffers from slow sensing speed caused by relatively large parasitics. Certain aspects of the present disclosure provide techniques for speeding up voltage-mode sensing such that this sensing mode matches (or is at least comparable to) current-mode sensing speed while retaining noise rejection benefits associated with voltage-mode sensing.

To increase the speed of voltage-mode sensing, TFT devices may be used to drive the sense line (e.g., column line) parasitics, such that the voltage at the column line of the ultrasonic sensor settles before a sensing phase of the ultrasonic sensor begins. The size of the ultrasonic sensor pixel circuitry may be relatively small because of area constraints on various devices, limiting signal drive capability in certain implementations. In certain aspects of the present disclosure, the parasitics on the sense lines may be split into two parts by using column buffers (e.g., also referred to as "column drivers") between portions of the sense line. In this manner, pixel drive devices may only see the column parasitics during a look-ahead sensing phase, while the column drivers see the remaining parasitics on the sense lines, as described in more detail herein. In other words, the voltage at the columns of the sensor array may be settled in a look-ahead manner where the columns predicted to be sensed next in sequence begin to settle while previous columns are being sensed.

Figure 3:
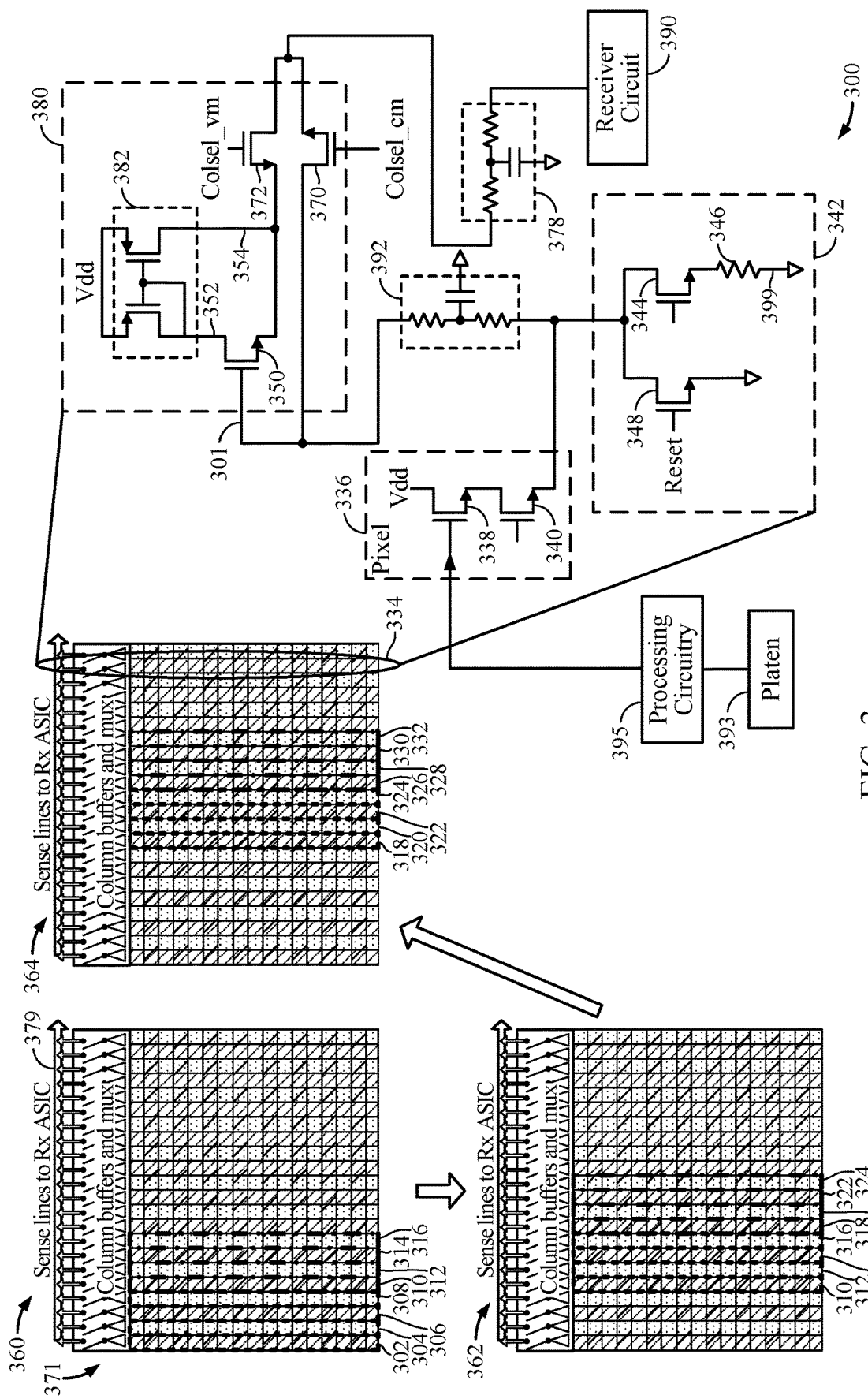
FIG. 3 illustrates a column line of a sensor array, in accordance with certain aspects of the present disclosure.

FIG. 3 illustrates a column line 301 of an ultrasonic sensor array 300 (e.g., corresponding to the ultrasonic sensor array 212 described with respect to FIG. 2B), in accordance with certain aspects of the present disclosure. As illustrated, the ultrasonic sensor array 300 includes multiple columns, each selectively coupled through respective buffers and switches (e.g., column buffers and multiplexer 371) via sense lines to a receiver circuit 390 (e.g., a receiver (Rx) ASIC).

As illustrated, the column line 301 of the column 334 is coupled to a pixel 336 having a transistor 338 (e.g., n-type metal-oxide-semiconductor (NMOS) transistor). As used herein, a pixel generally refers to circuitry associated with a portion of an ultrasonic sensor array. The transistor 338 may be coupled to a platen 393 for ultrasonic sensing. For example, an ultrasonic signal may be received via the platen 393 and processed (e.g., converted to an electrical signal) via processing circuitry 395 (which may include a piezoelectric element, for example, among other components).

In certain aspects, a switch 340 (e.g., implemented as an NMOS transistor) may be coupled between the transistor 338 and the column line 301. The switch 340 may be a row select switch of the ultrasonic sensor array 300. The switch 340 may be closed during a look-ahead settling phase and a sensing phase, and open outside the look-ahead settling phase and the sensing phase. A column control circuit 342 may be coupled to the column line 301 and may include a transistor 344 and a resistive element 346. The transistor 344 and the resistive element 346 may be series coupled between the column line 301 and a reference potential node 399 (e.g., electric ground). The transistor 338 may be biased to sink a current from the column line 301 during a sensing phase (also referred to as a "read phase") of the ultrasonic sensor array, as described in more detail herein. The sensing phase may be implemented using voltage-mode (VM) sensing (e.g. during a VM sensing phase), or current-mode (CM) sensing (e.g., during a CM sensing phase), as described in more detail herein.

The column control circuit 342 may also include a transistor 348 for resetting (e.g., discharging) the column line 301, for example, after the sensing phase has completed. During the sensing phase, a drain of the transistor 338 may be coupled to a voltage rail Vdd, and the switch 340 may be closed. Thus, during the sensing phase of the ultrasonic sensor array 300, the transistor 338 may be configured as a source follower, amplifying (e.g., buffering with a unity gain) a signal at a gate of the transistor 338. The amplified signal may be read by a receiver circuit 390 electrically coupled to the column line 301 during the sensing phase. For example, when CM sensing is active, a CM column select switch 370 may be closed, and the drain-to-source current (Ids) of the transistor 338 may flow through the column line 301, across the CM column select switch 370, to the receiver circuit 390 for sensing.

When VM sensing is active, the CM column select switch 370 (Colsel_cm) may be opened, and the VM column select switch 372 (Colsel_vm) may be closed. As illustrated, the column control circuit 380 includes a current mirror 382. A first branch 352 of the current mirror 382 is coupled to a transistor 350. The transistor 350 senses the voltage at the column line 301 at a gate of the transistor 350, and sinks a current from the first branch 352 of the current mirror 382. The current sunk from the first branch 352 of the current mirror 382 is mirrored at a second branch 354 of the current mirror. The currents from the first branch 352 and second branch 354 of the current mirror 382 are combined and provided to the receiver circuit 390 for sensing. In certain aspects, the column line 301 may include a parasitic element 392, as illustrated by the example representative circuit of series resistance and shunt capacitance.

Certain aspects of the present disclosure are directed to techniques for look-ahead column sensing. For example, the ultrasonic sensor array 300 includes multiple columns, one or more of which may be undergoing sensing (e.g., during a sensing phase) by a receiver circuit, while other columns may undergo look-ahead settling (e.g., during a look-ahead settling phase). For instance, during a first time instance 360, columns 302, 304, 306, 308 may be undergoing sensing by the receiver circuit 390, while columns 310, 312, 314, 316 may be undergoing look-ahead settling. During a following time instance 362, the columns 310, 312, 314, 316 that were previously undergoing look-ahead settling may now undergo sensing by the receiver circuit 390, while columns 318, 320, 322, 324 may undergo look-ahead settling. In a similar fashion, during a following time instance 364, the columns 318, 320, 322, 324 that were previously undergoing look-ahead settling may now undergo sensing by the receiver circuit 390, while columns 326, 328, 330, 332 undergo look-ahead settling. While FIG. 3 illustrates four columns undergoing sensing while four other columns are undergoing look-ahead settling to facilitate understanding, the number of columns undergoing look-ahead settling or sensing may be less than or greater than four.

The look-ahead settling phase is used to settle parasitics associated with a column line, as described in more detail herein. For example, due to the parasitic element 392 of the column line 301, some latency may be associated with settling the voltage at the column line 301 prior to sensing by the receiver circuit 390. During the look-ahead settling phase, the voltage to be sensed at the column line 301 may be settled, such that during the sensing phase by the receiver circuit, any latency associated with settling the voltage at the column line (e.g., settling the parasitics associated with the column line) does not impact the sensing speed of the receiver circuit during the sensing phase. For instance, as described herein, a column control circuit 380 may be coupled to the column line 301 and may include a CM column select switch 370 and a VM column select switch 372. During VM sensing, the CM column select switch 370 is open, and the VM column select switch 372 is closed. During the look-ahead settling phase, both the CM column select switch 370 and the VM column select switch 372 may be open. Moreover, the drain of the transistor 338 may be coupled to a voltage rail Vdd, the row-select switch 340 may be closed, and the transistor 344 may be biased, allowing the voltage at the column line 301 to settle to a voltage level that is to be sensed later during a sensing phase.

As described herein, during the voltage sensing phase, the VM column select switch 372 is closed. The currents from the first branch 352 and the second branch 354 of the current mirror 382 are combined and provided to the receiver circuit 390 via one of sense lines 379. As illustrated, the sense line may include a parasitic element 378, an example of which is represented in FIG. 3 by series resistive elements and a shunt capacitive element. Thus, during the sensing phase, the latency associated with sensing the column line voltage may be caused by settling the parasitic element 378, as opposed to settling both the parasitic elements 392 and 378, since the parasitic element 392 of the column line 301 was previously settled during the look-ahead settling phase.

Therefore, the latency associated with reading a pixel during a sensing phase may be less as compared to conventional implementations.

In certain aspects, at every read transition from one set of pixels to the next, the coupling into the bias/column lines (e.g., the biasing of transistors 344) from low-to-high transitions may be cancelled out by coupling from high-to-low transitions. For example, a driver used to bias the transistor 344 may also drive transistors of other pixels of the other columns of the ultrasonic sensor. When the biasing signal of transistors of some of the columns are transitioning from low to high (e.g., at the beginning of a respective look-ahead sensing phase), the biasing signal of other transistors of other columns are transitioning from high to low (e.g., at the end of a respective sensing phase). Thus, slow bias circuits and pixel driver devices in a TFT process are unburdened from settling any alternating-current (AC) coupling and may be designed to be low power and small in size. In certain aspects, one or more dummy columns may be implemented at the edge of the ultrasonic sensor array. The dummy column may be used for dummy settling to mimic a look-ahead sensing phase at the edge of the ultrasonic array.

Figure 4:
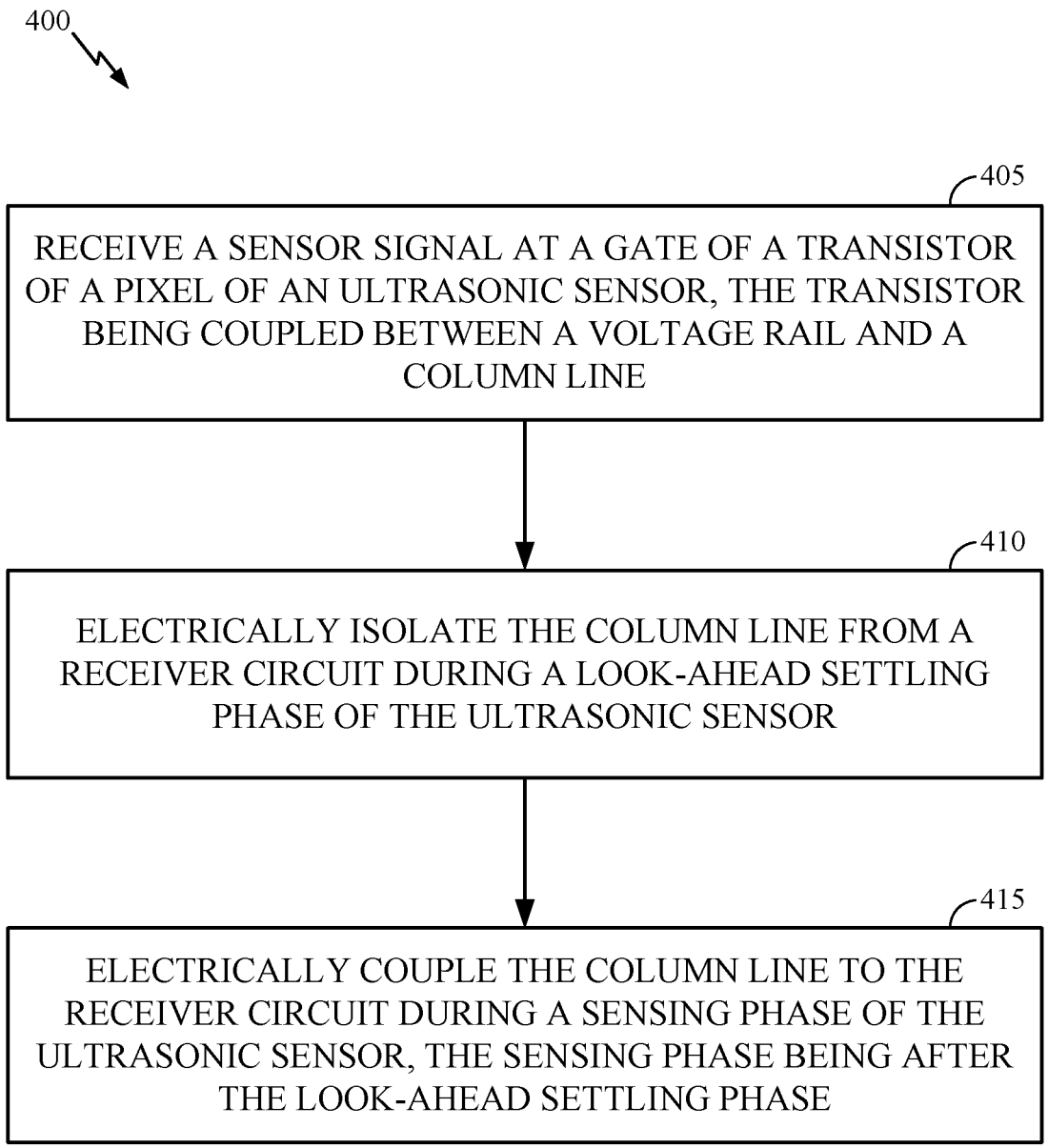
FIG. 4 is a flow diagram illustrating example operations for ultrasonic sensing, in accordance with certain aspects of the present disclosure.

FIG. 4 is a flow diagram illustrating example operations 400 for ultrasonic sensing, in accordance with certain aspects of the present disclosure. The operations 400 may be performed, for example, by an ultrasonic sensing system, which may include an ultrasonic sensor array (e.g., such as the ultrasonic sensor array 300) and/or a controller such as the controller 214.

The operations 400 may begin, at block 405, by the ultrasonic sensing system receiving a sensor signal at a gate of a transistor (e.g., transistor 338) of a pixel (e.g., pixel 336) of an ultrasonic sensor, the transistor being coupled between a voltage (e.g., Vdd) and a column line (e.g., column line 301), and at block 410, by electrically isolating (e.g., via switch 372) the column line from a receiver circuit (e.g., receiver circuit 390) during a look-ahead settling phase of the ultrasonic sensor. At block 415, the ultrasonic sensing system may electrically couple (e.g., via the switch 372) the column line to the receiver circuit during a sensing phase of the ultrasonic sensor, the sensing phase being after the look-ahead settling phase.

The operations 400 may also include sensing a voltage at the column line via another transistor (e.g., transistor 350) having a gate coupled to the column line, wherein coupling the column line to the receiver circuit comprises closing a switch (e.g., switch 372) between a source of the other transistor and the receiver circuit during the sensing phase. In certain aspects, electrically isolating (i.e., electrically decoupling) the column line from the receiver circuit may include opening the switch during the look-ahead settling phase. In certain aspects, the operations 400 may also include the ultrasonic sensing system generating a current (e.g., the drain-to-source current of transistor 350) based on the sensed voltage, mirroring (e.g., via the current mirror 382) the generated current, and providing a combination of the generated current and the mirrored current to the receiver circuit during the sensing phase.

In certain aspects, the sensing phase may include a voltage-mode sensing phase. In certain aspects, the operations 400 may also include closing another switch (e.g., switch 370) coupled between the column line and the receiver circuit during a current-mode sensing phase.

In certain aspects, the operations 400 may also include decoupling the first transistor from the column line outside of the look-ahead settling phase and the sensing phase. In certain aspects, the operations 400 may also include sinking (e.g., via the column control circuit 342) a current from the column line during the look-ahead settling phase.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. In certain aspects, means for receiving may comprise processing circuitry, such as the processing circuitry 395. Means for electrically isolating and means for electrically coupling may comprise a switch, such as the switch 370, which may be implemented by a transistor, for example.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with discrete hardware components designed to perform the functions described herein. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. An ultrasonic sensor comprising:
a column line;
a pixel having a first transistor coupled between a voltage rail and the column line;
a receiver circuit; and
a first column control circuit coupled between the receiver circuit and the pixel, the first column control circuit being configured to:
electrically isolate the column line from the receiver circuit during a look-ahead settling phase of the ultrasonic sensor; and
electrically couple the column line to the receiver circuit during a sensing phase of the ultrasonic sensor.

2. The ultrasonic sensor of claim 1, wherein the first column control circuit comprises:

a second transistor having a gate coupled to the column line; and
a switch coupled between a source of the second transistor and the receiver circuit.

3. The ultrasonic sensor of claim 2, wherein the first column control circuit is configured to electrically isolate the column line from the receiver circuit by opening the switch, and wherein the first column control circuit is configured to electrically couple the column line to the receiver circuit by closing the switch during the sensing phase.

4. The ultrasonic sensor of claim 2, wherein the first column control circuit further comprises a current mirror having a first branch coupled between the voltage rail and a drain of the second transistor and having a second branch coupled between the voltage rail and a source of the second transistor, the switch being coupled between the source of the second transistor and the receiver circuit.

5. The ultrasonic sensor of claim 2, wherein the sensing phase comprises a voltage-mode sensing phase.

6. The ultrasonic sensor of claim 5, wherein the first column control circuit further comprises another switch coupled between the column line and the receiver circuit, wherein the switch is closed during the voltage-mode sensing phase, and wherein the other switch is closed during a current-mode sensing phase of the ultrasonic sensor.

7. The ultrasonic sensor of claim 1, wherein the pixel comprises a switch coupled between the first transistor and the column line, the switch being closed during the look-ahead settling phase and the sensing phase.

8. The ultrasonic sensor of claim 1, further comprising a second column control circuit having a second transistor and a resistive element, the second transistor and the resistive element being series coupled between the column line and a reference potential node.

9. The ultrasonic sensor of claim 1, wherein the first transistor is decoupled from the column line outside of the look-ahead settling phase and the sensing phase.

10. The ultrasonic sensor of claim 1, wherein the ultrasonic sensor is configured as a fingerprint sensor.

11. A method for ultrasonic sensing, comprising:
receiving a sensor signal at a gate of a transistor of a pixel of an ultrasonic sensor, the transistor being coupled between a voltage rail and a column line;
electrically isolating the column line from a receiver circuit during a look-ahead settling phase of the ultrasonic sensor; and
electrically coupling the column line to the receiver circuit during a sensing phase of the ultrasonic sensor, the sensing phase being after the look-ahead settling phase.

12. The method of claim 11, further comprising sensing a voltage at the column line via another transistor having a gate coupled to the column line, wherein coupling the column line to the receiver circuit comprises closing a switch between a source of the other transistor and the receiver circuit during the sensing phase.

13. The method of claim 12, wherein electrically isolating the column line from the receiver circuit comprises opening the switch during the look-ahead settling phase.

14. The method of claim 12, further comprising:
generating a current based on the sensed voltage;
mirroring the generated current; and
providing a combination of the generated current and the mirrored current to the receiver circuit during the sensing phase.

15. The method of claim 12, further comprising closing another switch coupled between the column line and the receiver circuit during a current-mode sensing phase.

16. The method of claim 11, wherein the sensing phase comprises a voltage-mode sensing phase.

17. The method of claim 11, further comprising closing a switch coupled between the transistor and the column line during the look-ahead settling phase and the sensing phase.

18. The method of claim 11, further comprising sinking a current from the column line during the look-ahead settling phase.

19. The method of claim 11, further comprising decoupling the first transistor from the column line outside of the look-ahead settling phase and the sensing phase.

20. An apparatus for ultrasonic sensing, comprising:
- means for receiving a sensor signal at a gate of a transistor of a pixel of the apparatus, the transistor being coupled between a voltage rail and a column line;
- means for electrically isolating the column line from a receiver circuit during a look-ahead settling phase of the apparatus; and
- means for electrically coupling the column line to the receiver circuit during a sensing phase of the apparatus, the sensing phase being after the look-ahead settling phase.

* * * * *